(12) United States Patent
Cashen et al.

(10) Patent No.: US 11,867,852 B1
(45) Date of Patent: Jan. 9, 2024

(54) PHOTONIC CHIP BASED ATOMIC SENSORS

(71) Applicant: Vector Atomic, Inc., Pleasanton, CA (US)

(72) Inventors: Matthew Todd Cashen, Pleasanton, CA (US); Martin Machai Boyd, Pleasanton, CA (US); Christopher Scott Corder, Berkeley, CA (US)

(73) Assignee: Vector Atomic, Inc., Pleasanton, CA (US)

( * ) Notice: Subject to any disclaimer, the term of this patent is extended or adjusted under 35 U.S.C. 154(b) by 0 days.

(21) Appl. No.: 18/340,396

(22) Filed: Jun. 23, 2023

(51) Int. Cl.
*G21K 1/02* (2006.01)
*G01T 3/00* (2006.01)

(52) U.S. Cl.
CPC ...................... *G01T 3/00* (2013.01)

(58) Field of Classification Search
CPC .. G21K 1/02; G21K 1/025; G01T 3/00; G04F 5/14
See application file for complete search history.

(56) References Cited

U.S. PATENT DOCUMENTS

| | | | | |
|---|---|---|---|---|
| 11,205,524 | B2 * | 12/2021 | Raman | G21K 1/025 |
| 2010/0187442 | A1 * | 7/2010 | Hochberg | G01S 17/42 |
| | | | | 250/492.1 |

OTHER PUBLICATIONS

Li, C., Chai, X., Wei, B. et al. Cascaded collimator for atomic beams traveling in planar silicon devices. Nat Commun 10, 1831 (2019). https://doi.org/10.1038/s41467-019-09647-3.

Isichenko, Andrei, et al. "Cooling rubidium atoms with a photonic integrated 3D magneto-optical trap." Optical Sensors. Optica Publishing Group, 2022, pp. 1-2.
Gustavson, Todd Lyndell. Precision rotation sensing using atom interferometry. Diss. stanford university, 2000, pp. 1-181.
Ropp et al., "Integrating planar photonics for multi-beam generation and atomic clock packaging on chip," Light: Science & Applications (2023) 12:83, pp. 1-11.
Matthew T. Hummon et al., "Photonic chip for laser stabilization to an atomic vapor with 10-11 instability," Optica, vol. 5. No. 4, Dated: Apr. 11, 2018, pp. 443-449.
Andrei Isichenko et al., "Photonic integrated beam delivery for a rubidium 3D magneto-optical trap," Department of Electrical and Computer Engineering, Date Accessed: Jun. 5, 2023, pp. 1-22.
"Session P1a: Advaned and Future Clocks," ION Institute of Navigation, Dated: Tuesday Jan. 24, 2023, pp. 1-4.
Liron Stern et al., "Light-Matter interactions in Atomic Cladding Wave Guides," Nature Communications, Dated: Mar. 5, 2013, pp. 1-8.
Martinez, et al. "A Chip-Scale Atomic Beam Clock", Nature Communications, Jun. 13, 2023 https://doi.org/10.1038/541467-023-39166-1.

* cited by examiner

*Primary Examiner* — David E Smith
*Assistant Examiner* — Hsien C Tsai
(74) *Attorney, Agent, or Firm* — Patterson + Sheridan, LLP (57) ABSTRACT

Embodiments herein describe an atomic sensor that includes a photonic die that outputs optical signals on a top surface. These optical signals can be directed and shaped as needed to satisfy a particular type of atomic sensor. In one embodiment, an atomic source (e.g., rubidium or cesium) is disposed on the photonic chip to emit atoms when heated. A collimator can then direct the emitted atoms along a path that intersects with the optical signals. This intersection can be used to detect motion (e.g., rotation and acceleration) of the atomic sensor.

23 Claims, 6 Drawing Sheets

PHOTONIC CHIP BASED ATOMIC SENSORS

BACKGROUND

Field

Embodiments of the present invention generally relate to forming an atomic sensor using a photonic die.

Description of the Related Art

Atomic sensors are cutting-edge devices that harness the principles of atomic physics to detect and measure various physical and chemical quantities with high precision. These sensors rely on the behavior and properties of atoms or molecules, such as their energy levels, quantum states, and interactions with external fields. By manipulating and probing atoms, atomic sensors can achieve greater levels of sensitivity and accuracy than other sensors.

Atomic sensors can be used in a wide range of applications. For instance, atomic clocks, which are highly accurate timekeeping devices based on the vibrations of atoms, are used in global navigation systems, telecommunications, and scientific research. Atomic magnetometers, which exploit the behavior of atomic spins in the presence of magnetic fields, are utilized in geophysical surveys, medical imaging, and defense applications. Additionally, atomic sensors find applications in areas such as gravimeters, accelerometers, gyroscopes, and trace gas detection. However, current atomic sensors can be large, are typically difficult to assemble, and rely on bulky optical components.

SUMMARY

One embodiment described herein is an atomic sensor that includes a photonic die that includes a plurality of optical interfaces configured to emit a plurality of optical signals on a top surface, an atomic source disposed on the top surface where the atomic source configured to emit atoms, and a collimator disposed on the top surface where the collimator configured to receive the atoms from the atomic source and direct them onto an atomic path that intersects the plurality of optical signals emitted by the photonic die.

Another embodiment described herein is an atomic sensor that includes a photonic die including a plurality of optical interfaces configured to emit a plurality of optical signals, an atomic source disposed on the photonic die where the atomic source configured to emit atoms, and a spacer disposed on the photonic die where the spacer comprising a collimator configured to receive the atoms from the atomic source and direct them onto an atomic path that intersects the plurality of optical signals emitted by the photonic die, and a lid disposed on the spacer to create a hermetic package under vacuum.

Another embodiment described herein is a method that includes attaching a spacer to a photonic die including a plurality of optical interfaces configured to emit a plurality of optical signals; disposing an atomic source on the photonic die after attaching the spacer, wherein the spacer comprises a collimator configured to, during operation, receive atoms emitted by the atomic source and direct them onto an atomic path that intersects the plurality of optical signals emitted by the photonic die; and placing a lid on the spacer to create a hermetic package.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein describe an atomic sensor that includes a photonic die that outputs optical signals on a top surface. These optical signals can be directed as needed to satisfy a particular type of atomic sensor by a photonic chip. As a result, the use of bulk optics can be reduced or eliminated, which can reduce the size of the sensors and the complexity of the assembly process. For example, rather than a technician having to adjust bulk optics to direct optical signals in a particular direction, or parallelize optical signals, a lithography process can be used when forming the photonic die to ensure the optical signals propagate in the desired directions.

In one embodiment, a spacer (e.g., a glass spacer) is placed on the top surface of the photonic die. The spacer can provide defined locations for atomic sources (e.g., rubidium or cesium). In one embodiment, the photonic die can include heaters for heating the atomic sources so that atoms are released. The spacer can also include integrated collimators that collimate the atoms along a well-defined atomic path with respect to the top surface of the photonic die. The atomic path may intersect with the optical signals emitted at the top surface of the photonic die. This interaction can be used to detect motion (e.g., rotation and acceleration) of the atomic sensor. For example, the atomic sensor may be part of a gyroscope or other type of motion sensor.

Figure 1:
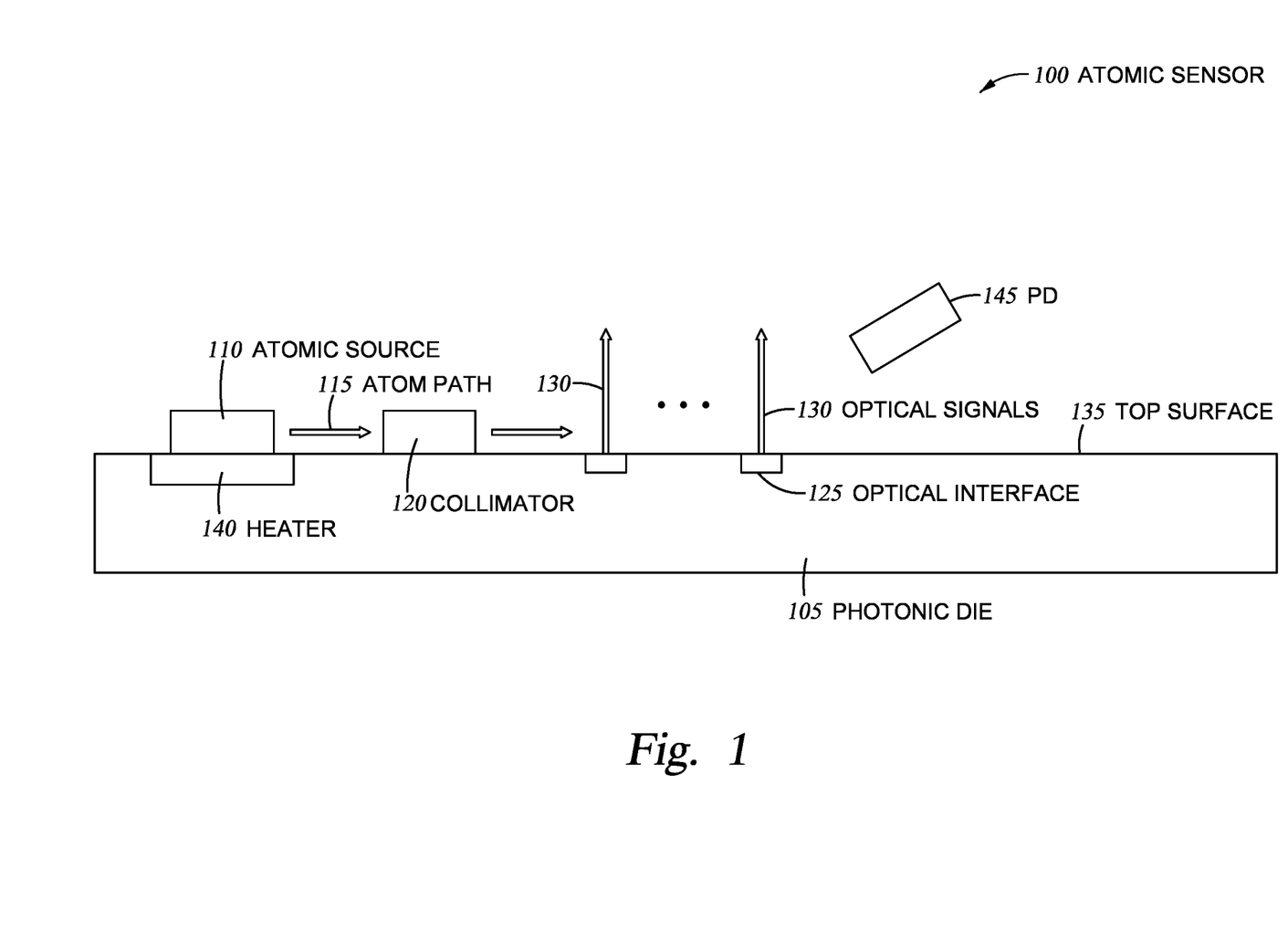
FIG. 1 illustrates an atomic sensor with a photonic die for outputting light at a top surface, according to one embodiment described herein.

FIG. 1 illustrates an atomic sensor 100 with a photonic die 105 for outputting light at a top surface 135, according to one embodiment described herein. As shown, the photonic die 105 (also referred to as a photonic integrated circuit (PIC) or photonic chip) includes a plurality of optical interfaces 125 that emit optical signals 130 from the top surface 135. In one embodiment, the optical interfaces 125 are grating couplers. Notably, lithography processes can be used to direct the optical interfaces 125 in a desired direction that intersects with an atom path 115. That is, rather than using bulk optics, the location of the optical interfaces 125 can be set so that the emitted optical signals 130 propagate in the desired directions.

Although FIG. 1 illustrates emitting the optical signals 130 in a direction that is perpendicular or orthogonal to the top surface 135, in some implementations the optical signals 130 may be emitted at different angles from the top surface 135. Put differently, the optical signals 130 may be emitted from the top surface 135 at other angles besides 90 degrees.

Moreover, the photonic die 105 may include any number of optical interfaces 125. Different types of atomic sensors may use a different number of optical signals 130. The embodiments herein can be adapted for any type of atomic sensor that relies on directing optical signals 130 through a path of atoms.

FIG. 1 further illustrates disposing an atomic source 110 on the top surface 135 of the die 105. The atomic source 110 is formed on a location of the photonic die 105 that includes a heater 140. The atomic source 110 can include a reservoir of rubidium or cesium. The heater 140 in (or on) the die 105 can heat the atomic source 110 so that the reservoir of rubidium or cesium emits atoms. In one embodiment, the sensor 100 is in a vacuum.

FIG. 1 illustrates an atom path 115 (i.e., the path at least some of the atoms emitted by the atomic source 110 take) that is approximately parallel to the top surface 135. The atom path 115 passes through a collimator 120 which collimates the atoms in the path 115. For example, the collimator 120 may include slits or holes that only permit the atoms traveling in a desired direction (i.e., the direction of the atom path 115) to pass through.

The collimated atom path 115 then passes through the optical signals 130 being emitted by the photonic die 105. The interaction between the optical signals 130 and the atoms in the path 115 will be discussed in more detail below. However, in one embodiment, the atoms interact with at least one of the optical signals 130 to cause the optical signal 130 to scatter. Put differently, depending on the state of the atoms when passing through an optical signal 130, the atoms may scatter the light of the optical signal 130. The intensity of the scattered light can be detected by a photodiode (PD) 145. The intensity of the light detected by the PD 145 can be correlated to a motion of the atomic sensor 100, such as rotation, acceleration, or both. For example, the atomic sensor 100 may be rigidly attached to a vehicle or a device where the motion of the sensor 100 can be used to detect a motion of the vehicle or the device.

While the embodiments below specifically describe an atomic sensor that can be used as a gyroscope, the arrangement illustrated in FIG. 1 is not limited to this type of sensor and may be used in other types of atomic (or molecule) sensors.

Figure 2:
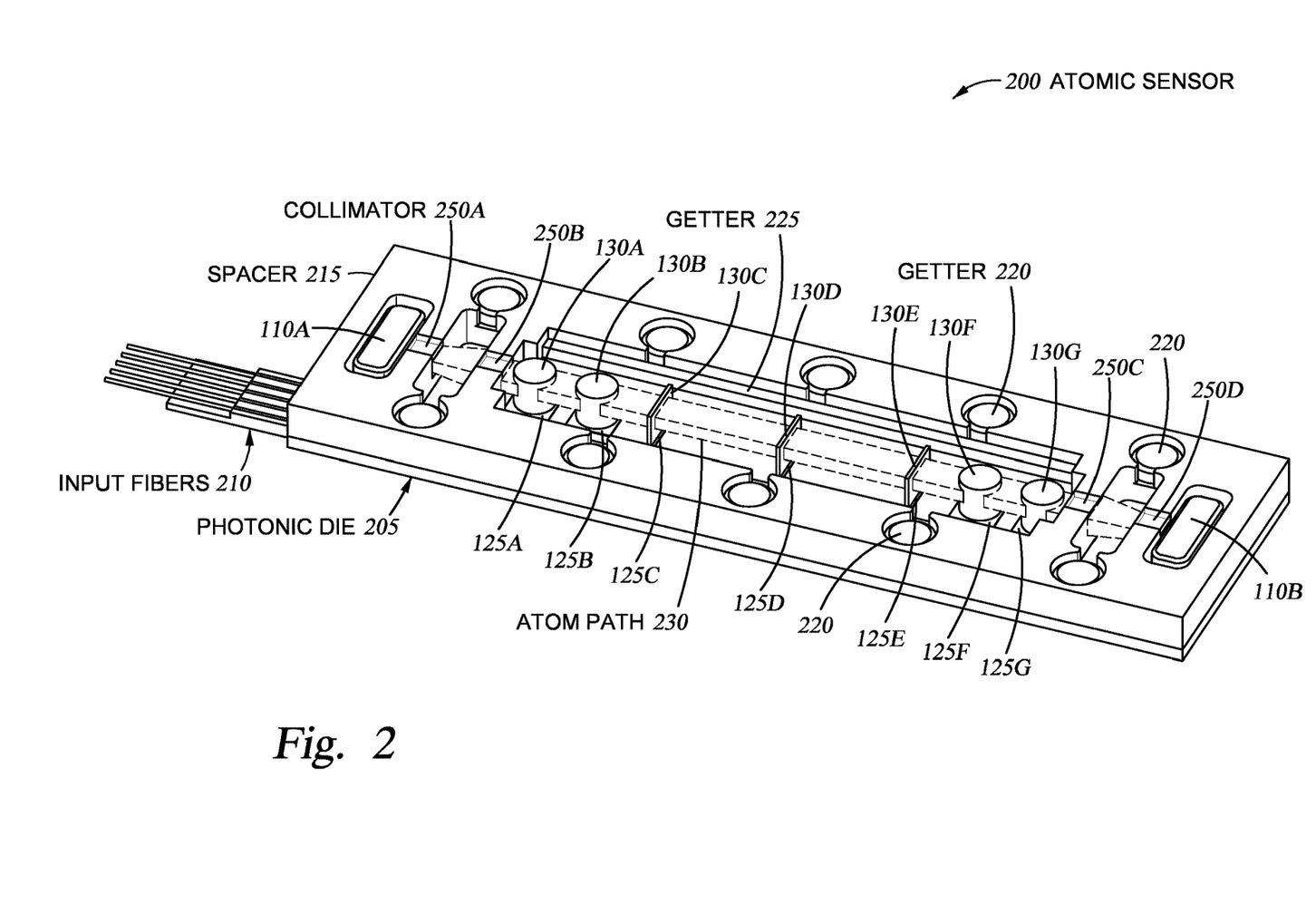
FIG. 2 illustrates an atomic sensor with a spacer disposed on a photonic die, according to one embodiment described herein.

FIG. 2 illustrates an atomic sensor 200 with a spacer 215 disposed on a photonic die 205, according to one embodiment described herein. In this example, the photonic die 205 is mated with input fibers 210 which provide the optical signals 130. Although not shown in this view, the photonic die 205 can include waveguides that route the optical signals 130 received by the input fibers 210 to the optical interfaces 125. Like in FIG. 1, the optical interfaces 125 emit the optical signals 130 from a top surface of the photonic die 205. While shown as being emitting in a direction orthogonal to the top surface, the optical signals 130 may be emitted at other angles so long as the optical signals 130 intersect with an atom path 230.

The spacer 215 is disposed on the top surface of the photonic die 205 (i.e., the same surface which emits the optical signals 130. The spacer 215 may be made using glass, silicon, or any other suitable material. The spacer 215 has been etched or formed to provide regions for atomic sources 110A and 110B which are located on opposite ends of the spacer 215. As discussed in FIG. 1, the photonic die 205 can include heaters disposed under the atomic sources 205 which provide heat so that the atomic sources 110 emit gaseous atoms.

The atoms emitted by the atomic sources 110 pass through one or more collimators (e.g., a first pair of collimators 250A and 250B and a second pair of collimators 250C and 250D). The collimators 250 collimate the atoms so that the atoms released by each source 110 have a well-defined divergence and direction. In this case, the atoms emitted by the atomic source 110A travel from left to right along the atom path 230 while the atoms emitted by the atomic source 110B travel from right to left along the atom path 230. The atom path 230 is illustrated in FIG. 2 as a rectangular path that travels through free space between the pairs of collimators 250.

As shown, the atom path 230 intersects with seven optical signals 130A-G emitted by the optical interfaces 125A-G (e.g., grating couplers) in the photonic die 205. The optical signals 130 can have different purposes depending on the application. In one embodiment, some of the optical signals 130 have different frequencies.

Assuming the atomic sensor 200 is used to form a gyroscope, the optical signal 130A can be state preparation signal that puts the atoms released by the atomic source 110A in a desired state while the optical signal 130G can be state preparation signal that puts the atoms released by the atomic source 110B in a desired state.

The optical signal 130B may be a detection signal used to detect a change of state in the atoms emitted by the atomic source 110B traveling to right to left, while the optical signal 130F may be a detection signal used to detect a change of state in the atoms emitted by the atomic source 110A traveling to left to right. In one embodiment, the optical signal 130B has no, or very little effect, on the atoms traveling from left to right and the optical signal 130F has no or little effect on the atoms traveling from right to left. For example, the optical signal 130A can put the atoms traveling from left to right in a state that is unaffected by the optical signal 130B, and similarly the optical signal 130G can put the atoms traveling from right to left in a state that is unaffected by the optical signal 130F.

The optical signals 130C-E may perform Doppler sensitive two-photon Raman transitions on the atoms to make an atom interferometer sensitive to rotations and/or accelerations. If there is rotation and/or acceleration, the amount of light from optical signals 130B and 130F scattered by the atoms change. That is, after passing through the Raman optical signals 130C-E, the atoms traveling from left to right may can scatter the optical signal 130F, while the atoms traveling from right to left pass through the Raman optical signals 130C-E and can scatter the optical signal 130B. This scattering can be detected by one or more PDs. While not shown, the PDs can be arranged such that when there is no scattering of the optical signals 130B and 130F, very little or no light is detected by the PDs. However, when motion leads the atoms to interact with optical signals 130B and 130F and scatter these signals, the PDs detect the light. For example, the PDs may be arranged so they are not in the beam path of the optical signals 130B and 130F so they detect light only when the atoms scatter these optical signals. A control system (not shown) can receive the electrical signal generated by the PDs and calculate a rotation and/or acceleration of the atomic sensor 200.

The atomic sensor 200 includes two atomic sources 110 because this provides a differential way of measuring rotation. That is, the sign of the sensitivity to rotation is proportional to the velocity vector. The control system can take the difference (e.g., subtract) of the phase of the atom interference signals to extract the rotation. Thus, having two atomic sources 110 may provide more accurate results than using one atomic source 110; however, one atomic source 110 may be sufficient for some implementations.

Also, the atoms can be sensitive to acceleration. The acceleration is not dependent on the velocity direction, but the atoms traveling in opposite direction both detect the same acceleration and detect rotations in opposite signs so that by differencing the signals the controls system can separate the acceleration signal from the rotation signals. In this manner, the atomic sensor 200 can measure both rotation and acceleration.

Moreover, getters 220 and 225 can be added to the spacer 215 (e.g., integrated into the spacer 215 or placed in regions defined by the spacer 215) for maintaining a vacuum. For example, the atomic sensor 200 may be placed in a sealed vacuum environment. The getters 220 and 225 can absorb the atoms emitted by the atomic sources 110 so the volume does not fill with the atoms emitted by those sources and lose the vacuum. For example, the circular getters 220 may be sintered porous getters. The getter 225 may be a graphite getter. However, the getters can be any material that absorbs the atoms emitted by the atomic sources 110 or residual gasses in the enclosure.

In one embodiment, a cross section of the atomic path 230 has dimensions of approximately 2 mm×1 mm. The optical signals 130A-B and 130F-G (e.g., the state preparation optical signals and the detection optical signals) have diameters of approximately 3 mm. The optical signals 130C-E (e.g., the Raman optical signals) have elliptical shapes with a major axis of approximately 4 mm and a minor axis of approximately 0.1 mm.

In one embodiment, the combination of the photonic die 205 and the spacer 215 have dimensions of approximately 7 cm×2 cm×0.5 cm. Notably, these dimensions can vary depending on the type of fabrication technology being used to produce the photonic die 205 and the spacer 215. In one embodiment, the spacer 215 may be anodically bonded to the photonic die 205.

Some non-limiting advantages of the atomic sensor 200 include a reduction or elimination of hand aligned optics (since alignment may be taken care by lithography when fabricating the photonic die 205), integrating optics assembly and vacuum packing, gyro collimation packages integrated into the spacer 215, and ovenize-able packages (e.g., if the whole package is heated rather than heating only the atom sources).

Figure 3:
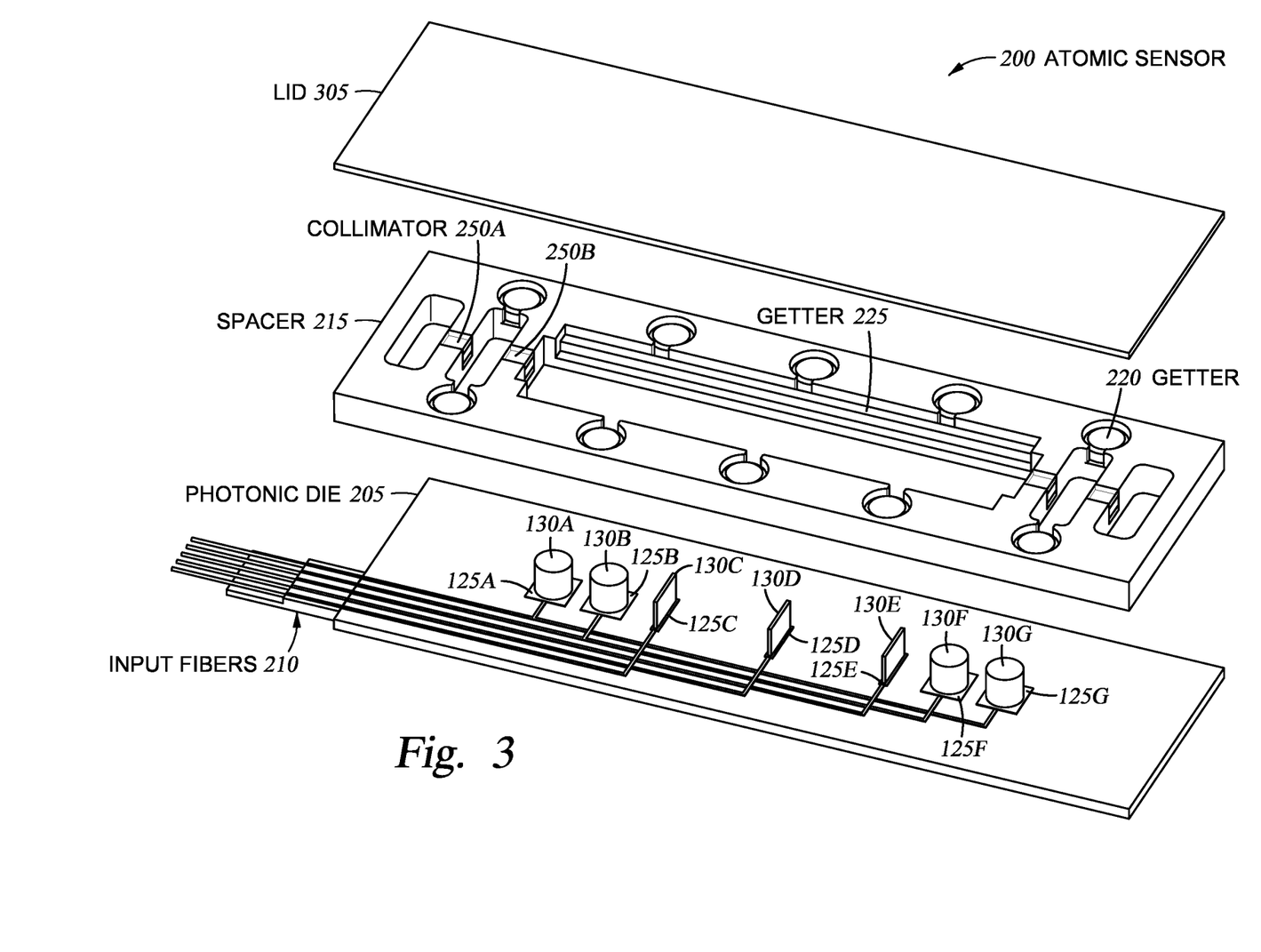
FIG. 3 illustrates a blowout view of the atomic sensor in FIG. 2, according to one embodiment described herein.

FIG. 3 illustrates a blowout view of the atomic sensor 200, according to one embodiment described herein. That is, FIG. 3 illustrates a view of the atomic sensor 200 before the spacer 215 is placed on the top surface of the photonic die 205. FIG. 3 illustrates waveguides in the photonic die 205 that transmit the optical signals received by the input fibers 210 (e.g., a fiber array) to the optical interfaces 125.

FIG. 3 also illustrates that the getters 220 and 225 can be placed in the spacer 215 before the spacer 215 is attached to the photonic die 205. However, the atomic sources may be formed after the spacer 215 has been placed on the photonic die 205. That is, FIG. 3 illustrates that the spacer 215 includes apertures for the atomic sources but that the atomic source have not yet been added. This may be done after the spacer 215 is placed on the photonic die 205.

In one embodiment, the photonic die 205 may have alignment marks or features to align the spacer 215 to the photonic die 205. Correct alignment is important so that the direction of the atomic path established by the collimators 250 in the spacer 215 intersects with the optical signals 130 emitted by the photonic die 205. In one embodiment, the photonic die 205 may have alignment marks. In one embodiment, the spacer 215 and the photonic die 205 may include male and female members which can be mated to ensure correct alignment.

FIG. 3 also illustrates a lid 305 which can be disposed on top of the spacer 215 to form a seal (e.g., a hermetic package). For example, the atomic sensor 200 may be assembled in a vacuum box. Thus, when the sensor 200 is removed from the vacuum box, the seal created by the lid 305 maintains a vacuum within the interior space defined by the spacer 215. As discussed above, the getters 220 and 225 can maintain this vacuum as atoms are emitted by the atomic sources during operation.

In one embodiment, the lid 305 includes mirrors that reflect the optical signals 130 in a direction back towards the optical interfaces 125 (e.g., retroreflection). That is, the side of the lid 305 facing the photonic die 205 can have respective mirrors that reflect the optical signals 130 in the reverse direction they are emitted by the photonic die 205.

Figure 4:
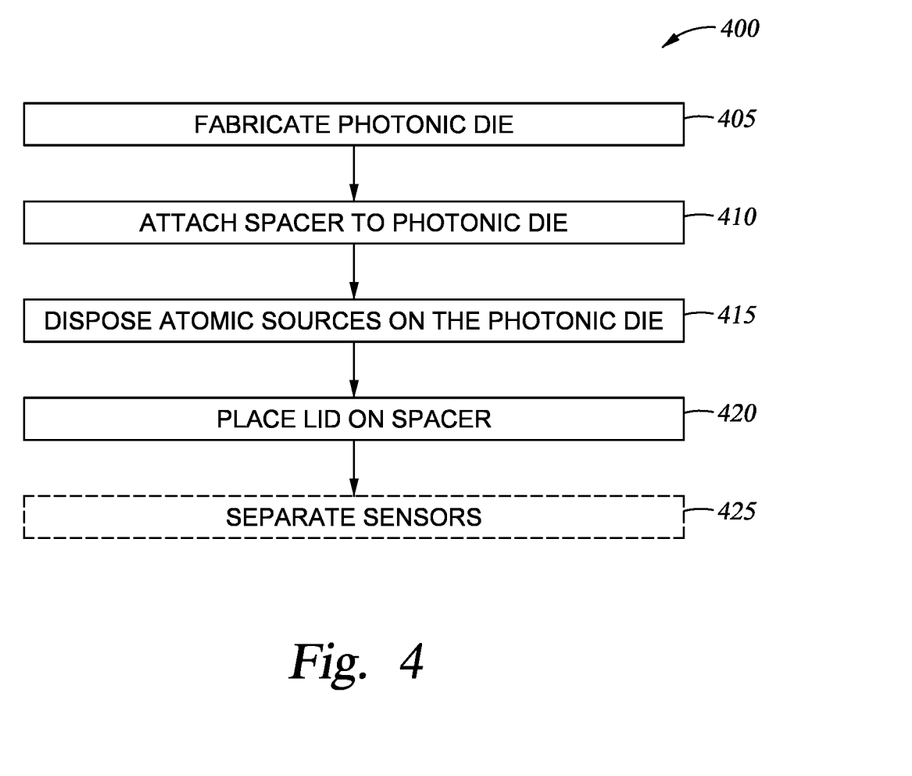
FIG. 4 is a flowchart for assembling an atomic sensor, according to one embodiment described herein.

FIG. 4 is a flowchart of a method 400 for assembling an atomic sensor, according to one embodiment described herein. At block 405, a photonic die is fabricated to have optical interfaces that emit optical signals at a top surface. For example, a lithography process can be used to form grating couplers near the top surface of the photonic die. The photonic die can include waveguides that optically couple the grating couplers to received optical signals. While the embodiments herein discuss receiving the optical signals using optical fibers coupled to, e.g., a side edge of the photonic die, in other embodiments, the optical signals may be generated on the photonic die.

In one embodiment, a wafer of photonic dies is formed. That is, the wafer can include tens or hundreds of photonic dies. As such, the method 400 can be performed at a wafer-level or at a die-level.

At block 410, a spacer (e.g., the spacer 215 in FIG. 2) is attached to the photonic die. In one embodiment, the spacer is attached to the same surface of the photonic die that includes the optical interfaces. In one embodiment, the spacer has the same dimensions as the photonic die, but this is not a requirement.

In one embodiment, block 410 is performed with the spacer and the photonic die being in a vacuum box. For example, a technician may attach the spacer to the photonic die while the components are in the vacuum box. If done at a wafer level, the technician may attach a wafer containing a plurality of the spacers to a wafer containing a plurality of the photonic dies. Alternatively, the spacers may be individual components (i.e., are not formed in a wafer) in which case the technician may still connect individual spacers to each photonic die in the wafer.

At block 415, the technician or fabrication system disposes atomic sources on the photonic die. For example, the technician may form a reservoir of rubidium or cesium (or some other suitable elemental material) within the cavities provided by the spacer that align with heaters formed in or on the photonic die. Again, this can be done when the sensor is within the vacuum box.

At block 420, the technician or fabrication system places a lid on the spacer to seal the interior (or cavity) of the spacer. Once the lid creates a hermetic sealed volume, the sensor can be removed from the vacuum environment (e.g., the vacuum box). The interior of the spacer will remain under vacuum.

Block 425 is an optional step that is performed when wafer-level assembly is performed. If the sensors are formed using a wafer of photonic dies, these sensors can then be separated to form individual sensors (e.g., dice the wafer to separate the sensors).

Figure 5A:
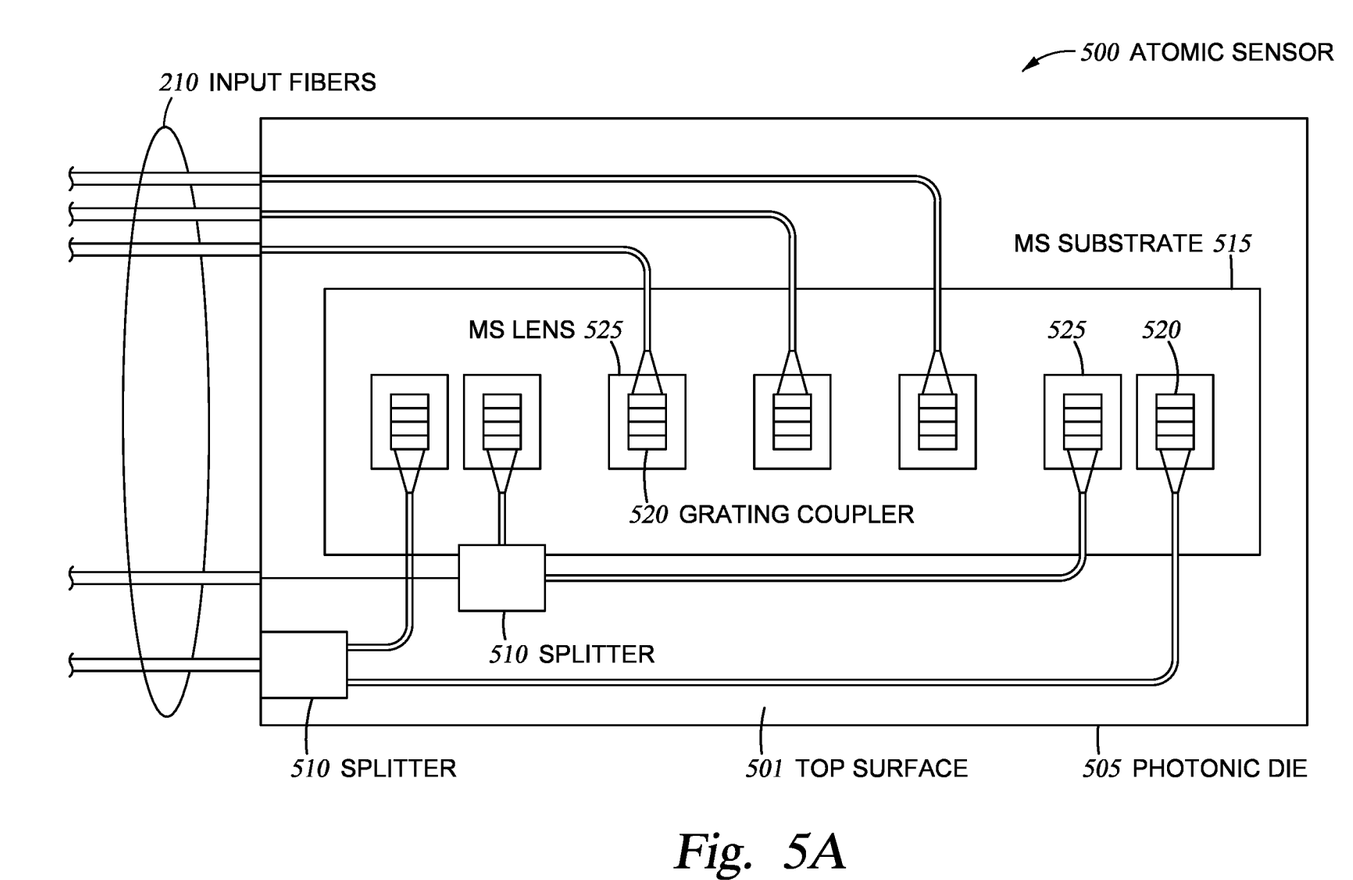
FIG. 5A illustrates a top view of an atomic sensor with a meta surface substrate, according to one embodiment described herein.

FIG. 5A illustrates a top view of an atomic sensor 500 with a meta surface (MS) substrate 515, according to one embodiment described herein. In this case, the MS substrate 515 is disposed on a top surface 501 of a photonic die 505 which includes grating couplers 520 (e.g., optical interfaces) for outputting the optical signals from the top surface 501.

The MS substrate 515 includes MS lenses 525 that each align to, or cover, one of the grating couplers 520. As discussed in more detail in FIG. 5B, the MS lenses 525 can change the shape and the polarization of the optical signals (e.g., perform beam shaping and polarization). For example, the MS lenses 525 may form the optical signals in the circular and elliptical shapes of the optical signals 130 illustrated in FIGS. 2 and 3, and the lenses 525 may make some of the optical signals circularly polarized and others linearly polarized.

In one embodiment, the MS substrate 515 is attached to the photonic die 505 before the spacer is attached to the top surface 501.

In an alternative embodiment, rather than using MS lenses 525 to provide polarization, waveplates may be disposed over the grating couplers 520 to provide the desired polarization of the optical signals. The waveplates may be disposed over the grating couplers 520 (e.g., the optical interfaces) at the same locations as the MS lenses 525 in FIG. 5.

In yet another embodiment, bulk optics (e.g., lenses) could be disposed over the grating couplers 520 to perform beam shaping. However, in yet another embodiment, no MS lenses, waveplates, or bulk optics may be needed. That is, the photonic die 505 itself can output the optical signals with the desired beam shape and polarization.

FIG. 5A also illustrates the input fibers 210 providing the optical signals that are emitted by the grating couplers 520. In this example, the photonic die 505 includes optical splitters 510 for splitting two of the received optical signals. For example, the detection optical signals and the state preparation optical signals may be the same. Thus, rather than receiving two different optical signals using two input fibers 210, one optical signal is received and then split using one of the optical splitters 510 in the photonic die 505.

Figure 5B:
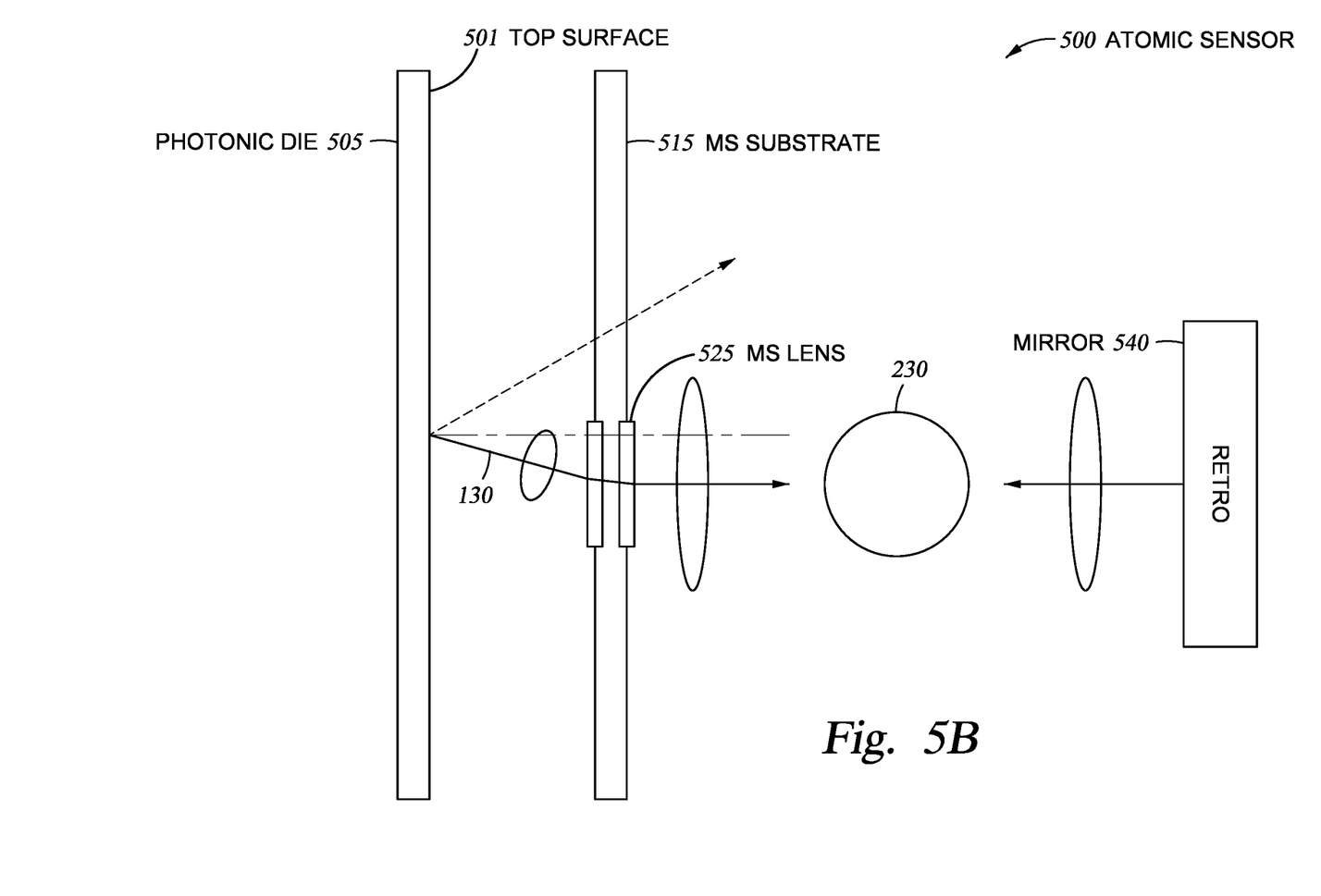
FIG. 5B illustrates a side view of an atomic sensor with a meta surface substrate, according to one embodiment described herein.

FIG. 5B illustrates a side view of the atomic sensor 500, according to one embodiment described herein. This view illustrates that the MS substrate 515 stands off from the photonic die 505. That is, there is a gap between the top surface 501 of the photonic die 505 and the MS substrate 515. However, in other embodiments, the MS substrate 515 may directly contact the photonic die 505.

As shown, an optical signal 130 is emitted from the top surface 501 of the grating coupler. In this example, when emitted, the optical signal 130 does not have a desired shape—e.g., the elliptical shape of the optical signals 130C-E in FIGS. 2 and 3. The optical signal 130 then passes through the MS lens 525 on the MS substrate 515 which redirects the path of the optical signal 130 so that it is normal to the top surface 501. For example, it may be difficult for the optical signal 130 to be emitted from the photonic die 305 in a direction that is normal to the top surface 501. The optical system can use the MS lens 525 to redirect the optical signal 130 to any desired direction (e.g., normal to the top surface 501). However, in other embodiments the optical signal 130 can pass through the MS lens 525 without changing directions.

The MS lens 525 also re-shapes the beam of the optical signal 130 into the desired shape—e.g., an extended elliptical shape. Thus, in this example, the MS lens 525 can help to shape the beam of the optical signal before it passes through the atom path 230. Moreover, the MS lens 525 can also put the optical signal 130 in a desired polarization—e.g., circularly or linearly polarized. In this manner, the MS lens 525 can help to shape and/or polarize the optical signals emitted at the top surface 501 of the photonic die 505.

Moreover, FIG. 5B illustrates that after passing through the atom path 230, the optical signal 130 is reflected by a mirror 540 in the reverse direction. In one embodiment, the mirror 540 is integrated into the lid (e.g., the lid 305 in FIG. 5) of the atomic sensor. However, in another embodiment, the mirror 540 can be integrated into the spacer (e.g., the spacer 215 in FIG. 2).

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An atomic sensor, comprising:
a photonic die comprising a plurality of optical interfaces configured to emit a plurality of optical signals on a top surface;
an atomic source disposed on the top surface, the atomic source configured to emit atoms; and
a collimator disposed on the top surface, the collimator configured to receive the atoms from the atomic source and direct them onto an atomic path that intersects the plurality of optical signals emitted by the photonic die.

2. The atomic sensor of claim 1, further comprising:
a photodiode arranged to detect scattering of a first optical signal of the plurality of optical signals due to the atoms traveling through the first optical signal.

3. The atomic sensor of claim 2, wherein a second optical signal one of the plurality of optical signals is a state preparation signal configured to put the atoms in a desired state, a set of the plurality of optical signals that induce Doppler-sensitive Raman transitions, and the first optical signal is a detection signal that is configured to be absorbed by the atoms, which scatter light in directions other than a direction of the first optical signal.

4. The atomic sensor of claim 1, further comprising:
a heater disposed on or in the photonic die, wherein the heater is arranged proximate to the atomic source and is configured to generate heat that causes the atomic source to emit the atoms.

5. The atomic sensor of claim 1, further comprising:
a second atomic source disposed on the top surface, the second atomic source configured to emit atoms; and
a second collimator disposed on the top surface, the second collimator configured to receive the atoms from the second atomic source and direct them onto a second atomic path that intersects the plurality of optical signals emitted by the photonic die,
wherein the second atomic path established by the second collimator is parallel with the atomic path established by the collimator.

6. The atomic sensor of claim 1, wherein the plurality of optical interfaces are grating couplers.

7. The atomic sensor of claim 1, further comprising:
a spacer disposed on the top surface, the spacer defining a first region for the atomic source and a second region for the atomic path, and wherein the collimator is integrated into the spacer.

8. The atomic sensor of claim 7, further comprising:
a lid disposed on the spacer, the lid and the spacer creating a hermetic sealed volume, wherein the hermetic sealed volume is under vacuum.

9. The atomic sensor of claim 8, further comprising:
getters configured to absorb the atoms to maintain the vacuum.

10. The atomic sensor of claim 9, wherein the getters are integrated into the spacer.

11. The atomic sensor of claim 8, wherein the lid comprises a plurality of reflective surfaces to reflect the plurality of optical signals in an opposite direction.

12. The atomic sensor of claim 1, further comprising at least one of:
waveplates disposed over the plurality of optical interfaces; or
meta surface (MS) lenses disposed over the plurality of optical interfaces, wherein the plurality of optical signals are configured to pass through the waveplates or the MS lenses before intersecting with the atomic path.

13. An atomic sensor, comprising:
a photonic die comprising a plurality of optical interfaces configured to emit a plurality of optical signals;
an atomic source disposed on the photonic die, the atomic source configured to emit atoms;
a spacer disposed on the photonic die, the spacer comprising a collimator configured to receive the atoms from the atomic source and direct them onto an atomic path that intersects the plurality of optical signals emitted by the photonic die; and
a lid disposed on the spacer to create a hermetic package under vacuum.

14. The atomic sensor of claim 13, further comprising:
a photodiode arranged to detect scattering of a first optical signal of the plurality of optical signals due to the atoms traveling through the first optical signal,
wherein a second optical signal one of the plurality of optical signals is a state preparation signal configured to put the atoms in a desired state, a set of the plurality of optical signals that induce Doppler-sensitive Raman transitions, and the first optical signal is a detection signal that is configured to be absorbed by the atoms, which scatter light in directions other than a direction of the first optical signal.

15. The atomic sensor of claim 13, further comprising:
a heater disposed on or in the photonic die, wherein the heater is arranged proximate to the atomic source and is configured to generate heat that causes the atomic source to emit the atoms.

16. The atomic sensor of claim 13, further comprising:
a second atomic source disposed on the photonic die, the second atomic source configured to emit atoms; and
a second collimator integrated into the spacer, the second collimator configured to receive the atoms from the second atomic source and direct them onto a second atomic path that intersects the plurality of optical signals emitted by the photonic die,
wherein the second atomic path established by the second collimator is parallel with the atomic path established by the collimator.

17. The atomic sensor of claim 13, wherein the spacer further comprising getters configured to absorb the atoms to maintain the vacuum.

18. The atomic sensor of claim 13, further comprising at least one of:
waveplates disposed over the plurality of optical interfaces; or
meta surface (MS) lenses disposed over the plurality of optical interfaces, wherein the plurality of optical signals are configured to pass through the waveplates or the MS lenses before intersecting with the atomic path.

19. A method comprising:
attaching a spacer to a photonic die comprising a plurality of optical interfaces configured to emit a plurality of optical signals;
disposing an atomic source on the photonic die after attaching the spacer, wherein the spacer comprises a collimator configured to, during operation, receive atoms emitted by the atomic source and direct them onto an atomic path that intersects the plurality of optical signals emitted by the photonic die; and
placing a lid on the spacer to create a hermetic package.

20. The method of claim 19, wherein attaching the spacer to the photonic die, disposing the atomic source on the photonic die, and placing the lid on the spacer are performed in an environment under vacuum such that the hermetic package is under vacuum.

21. The method of claim 19, further comprising:
attaching a second spacer to a second photonic die, wherein the second photonic die is part of a same first wafer as the photonic die;
disposing a second atomic source on the second photonic die after attaching the second spacer;
placing a second lid on the second spacer to create a second hermetic package; and
dicing the first wafer to separate the photonic die from the second photonic die after placing the second lid on the second spacer.

22. The method of claim 21, wherein the second spacer is part of a same second wafer as the spacer, wherein dicing the first wafer also dices the second wafer to separate the spacer from the second spacer.

23. The method of claim 22, wherein the second lid is part of a same third wafer as the lid, wherein dicing the first wafer also dices the third wafer to separate the lid from the second lid.

* * * * *